United States Patent [19]
Richardson

[11] Patent Number: 5,479,608
[45] Date of Patent: Dec. 26, 1995

[54] GROUP FACILITY PROTECTION IN A DIGITAL TELECOMMUNICATIONS SYSTEM

[75] Inventor: C. Douglas Richardson, Dallas, Tex.

[73] Assignee: Alcatel Network Systems, Inc., Richardson, Tex.

[21] Appl. No.: 916,333

[22] Filed: Jul. 17, 1992

[51] Int. Cl.⁶ .................................................. G06F 11/34
[52] U.S. Cl. ................ 395/182.02; 370/16; 340/825.01
[58] Field of Search .............................. 371/8.2, 7, 11.1, 371/68.2, 11.2; 364/240.7; 370/77, 85.13, 16; 395/575; 340/825.01, 825.03, 826, 825.79, 825.8, 827; 379/219

[56] References Cited

U.S. PATENT DOCUMENTS

| | | | |
|---|---|---|---|
| 4,393,493 | 7/1903 | Edwards | 370/16 |
| 4,394,541 | 7/1983 | Seden | 340/825.79 |
| 4,412,323 | 10/1983 | Abbott et al. | 370/16 |
| 4,646,286 | 2/1987 | Reid et al. | 370/16 |
| 4,736,465 | 4/1988 | BoBey et al. | |
| 4,807,280 | 2/1989 | Posner et al. | |
| 4,837,760 | 6/1989 | Reid et al. | 370/16 |
| 4,855,999 | 8/1989 | Chao | 370/84 |
| 4,876,682 | 10/1989 | Graves et al. | 370/84 |
| 4,893,306 | 1/1990 | Chao et al. | 370/84 |
| 4,914,429 | 4/1990 | Upp | 340/825.79 |
| 4,926,446 | 5/1990 | Grovor et al. | 375/109 |
| 4,967,405 | 10/1990 | Upp et al. | 370/1 |
| 4,970,721 | 10/1990 | Aczel et al. | 370/58.1 |
| 5,040,170 | 8/1991 | Upp et al. | 359/135 |
| 5,060,229 | 10/1991 | Tyrell et al. | 370/110.1 |
| 5,069,521 | 12/1991 | Hardwick | 370/16 |
| 5,073,774 | 12/1991 | Ikawa | 371/81 |
| 5,105,420 | 4/1992 | Ardon et al. | 370/54 |
| 5,157,655 | 10/1992 | Hamlin, Jr. et al. | 370/84 |
| 5,159,595 | 10/1992 | Flanagan et al. | 370/85.15 |
| 5,163,041 | 11/1992 | Moriyama | 370/16 |
| 5,185,736 | 2/1993 | Tyrrell et al. | 370/55 |
| 5,189,410 | 2/1993 | Kosvgi et al. | 370/105.1 |

(List continued on next page.)

FOREIGN PATENT DOCUMENTS

| | | | |
|---|---|---|---|
| 4154229 | 5/1992 | Japan | H04J 3/06 |
| 2220329 | 4/1990 | United Kingdom | H04L 1/22 |

OTHER PUBLICATIONS

Aprille et al "The Impact of a Synchronous Digital Network on the End User." IEEE 1990 pp. 255–257.
Grover "On the Design of a DS–3 Multiplex with Signaling channel Derived by C–bit Liberation" IEEE 1990 pp. 2203–2210.
Sonet specification TA–NWT–000253, Issue 6 (Bellcore, Sep. 1990), pp. 5–6 through 5–18.

Primary Examiner—Robert W. Beausoliel, Jr.
Assistant Examiner—Albert Décady
Attorney, Agent, or Firm—Vinson & Elkins

[57] ABSTRACT

A telecommunications system having 1:n group facility protection is disclosed. Two cross-connects are provided, each organized in a distributed fashion, and which have a group of member ports bidirectionally coupled to one another in corresponding fashion via a plurality of paths, such as of the DS-3 data frame type. Each of the cross-connects also include a bidirectional protection port, coupled to the protection port of the other cross-connect by way of a protection path, also preferably of the DS-3 type; the protection port for each cross-connect is assigned to the member port group, and is implemented to be managed by the same distributed interface processing unit as the protected member port group. The cross-connects monitor their member input ports for received facility errors, such as signal failures or excessive failure rates, and request a third-stage bridge from its mate cross-connect in the event of such error. Upon receipt of a good signal at the protection input port, the requesting cross-connect effects a first stage switch, so that the previously failing facility is received over the protection path. Communication of request and acknowledge signals over the protection path is preferably by way of the C-bit and X-bit channels, for DS-3 paths. The switch preferably reverts to the normal condition responsive to the facility becoming valid for a timeout period at the original member port.

13 Claims, 13 Drawing Sheets

U.S. PATENT DOCUMENTS

| | | | |
|---|---|---|---|
| 5,200,746 | 4/1993 | Yoshifuji | 340/825.79 |
| 5,200,950 | 4/1993 | Foglar et al. | 370/16 |
| 5,210,740 | 5/1993 | Anzai et al. | 370/16 |
| 5,216,666 | 6/1993 | Stalick | 370/16.1 |
| 5,239,537 | 8/1993 | Sakavchi | 370/16 |
| 5,299,293 | 3/1994 | Nestdagh et al. | 350/110 |
| 5,343,194 | 8/1994 | Bowdon | 370/16 |

GROUP FACILITY PROTECTION IN A DIGITAL TELECOMMUNICATIONS SYSTEM

This invention is in the field of digital telecommunications, and is more particularly directed to monitoring and redundancy schemes therein.

BACKGROUND OF THE INVENTION

As is well known in the art, significant advances have been made in telecommunications systems over recent years, particularly in the rate at which information can be communicated. Modern digital telecommunications systems and communication media provide very high bandwidth, such as the 44.736 Mbps data rate provided by the DS-3 data frame standard. Furthermore, conventional fiber optic cable and systems can provide even higher bandwidth and data rates by time-division multiplexing of up to twelve DS-3 lines, providing bandwidth of up to 536.8 Mbps.

These extremely high bandwidths now available in digital telecommunications systems have enabled the communication of large volumes of data at high speeds. Since voice channels require very little bandwidth (on the order of 4 kbps each), a large number of voice channels may now be communicated over a single communication line by way of time division multiplexing. The available bandwidth now also enables the communication of large blocks of digital data from computer-to-computer, as well as digital data representative of other media such as video displays.

Unlike voice transmissions, however, in which some amount of errored signals can be readily tolerated without garbling of the message, the successful transmission of digital data among computers requires high reliability and high quality transmission. Accordingly, conventional digital cross-connects now provide "performance monitoring" (commonly referred to as "PM"), by which the error rate of received digital data is monitored by way of cyclic redundancy check (CRC) and other conventional coding techniques. Such performance monitoring is used to ensure the desired grade of service desired by those telecommunications customers paying premium tariffs for high quality and low error rate communications.

Conventional telecommunications systems also generally provide some amount of redundancy so that failure of a telecommunications line or network element does not result in the loss of the communicated message. Conventional telecommunications systems with performance monitoring have implemented certain alarm conditions by which a human operator is alerted to events such as "loss of signal" and to error rates exceeding various thresholds. In response, the operator can manually switch to a redundant line to again enable communication of the digital data in the system. Of course, the procedure of generating an alarm condition and the manual switching of input/output ports to other lines cannot be effected quickly.

By way of further background, conventional fiber optic terminals (commonly referred to as FOTs) have implemented 1:1 redundancy for the fiber optic lines in a system, with some amount of automatic switching. According to this 1:1 redundancy scheme, the overhead portion of the bandwidth is monitored to determine if a loss-of-signal ("LOS") or alarm indication signal ("AIS") condition is being received. In these FOT 1:1 redundancy schemes, upon receipt of an LOS or AIS signal, the FOT will automatically switch its transmission to the other of the two fiber optic lines, enabling transmission of the data despite the failure of the first fiber optic line.

In addition, other conventional telecommunications systems include 1:1 redundancy schemes. However, since such protection schemes require that both the cabling and the input/output ports from cross-connects must be doubled from that required to carry traffic, such protection schemes are quite expensive and are thus available to customers only at high premium rates. As a result, the implementation of such protection schemes is generally limited to high grade of service communication, such as for the telecommunication of computer data.

By way of further background, conventional fiber optic systems operating according to the SONET standard can include 1:n line protection, in which one of several fiber optic lines in a group can be switched to a protection line. Such a protection scheme is described in the SONET specification TA-NWT-000253, Issue 6 (BELLCORE, September 1990). As noted above in the 1:1 fiber optic case, this protection is provided based on line data, with entire lines switching to the protection channel; no protection is provided on a path-by-path basis. Furthermore, the communication between nodes according to the SONET 1:n line protection scheme is by way of the K1, K2 bytes in the line overhead data. However, the use of such protocol is not available for providing 1:n protection of any kind, especially path protection, to a DS-3 network, due to insufficient available bandwidth.

It is therefore an object of the invention to provide a method and system for providing facility protection for a group of paths in a digital telecommunications system, where one redundant channel and port can protect multiple member ports.

It is a further object of the present invention to provide such a method and system which is useful in DS-3 bandwidth communications systems.

It is a further object of the present invention to provide such a method and system which effects such protection utilizing available bandwidth in a DS-3 standard system.

It is a further object of the present invention to provide such a method and system to provide such protection where the switching time between the member and protection channels for a failing path is extremely short, such as on the order of 100 msec or less.

It is a further object of the present invention to provide such a method and system which is revertive, in that the protection path is freed upon the member path returning to a good signal condition.

It is a further object of the present invention to provide such a method and system in a distributed manner in a digital cross-connect.

Other objects and advantages of the present invention will become apparent to those of ordinary skill in the art having reference to the following specification together with the drawings.

SUMMARY OF THE INVENTION

The invention may be implemented into a pair of digital cross-connects in a closed system relative to one another, by providing each with a protection port assigned to a group of member ports connected between the cross-connects. The cross-connects are of distributed type, having interface processor units controlling the switching among the group of member ports and the protection path responsive to signals communicated from the mate cross-connect along the protection path. Group facility protection is effected upon detection of an error condition, by the cross-connect requesting the other (responding) cross-connect to bridge the facility to the protection path, which it effects. Upon the requesting node receiving the valid facility, its input stage switches to the protection port to receive the facility. After the switch, the requesting node monitors the member port from which the facility was previously being received a valid signal has continued for a specified time, responsive to which the requesting node switches back to the original member port and instructs the responding node to release the bridge.

DETAILED DESCRIPTION OF THE PREFERRED EMBODIMENT

Figure 1:
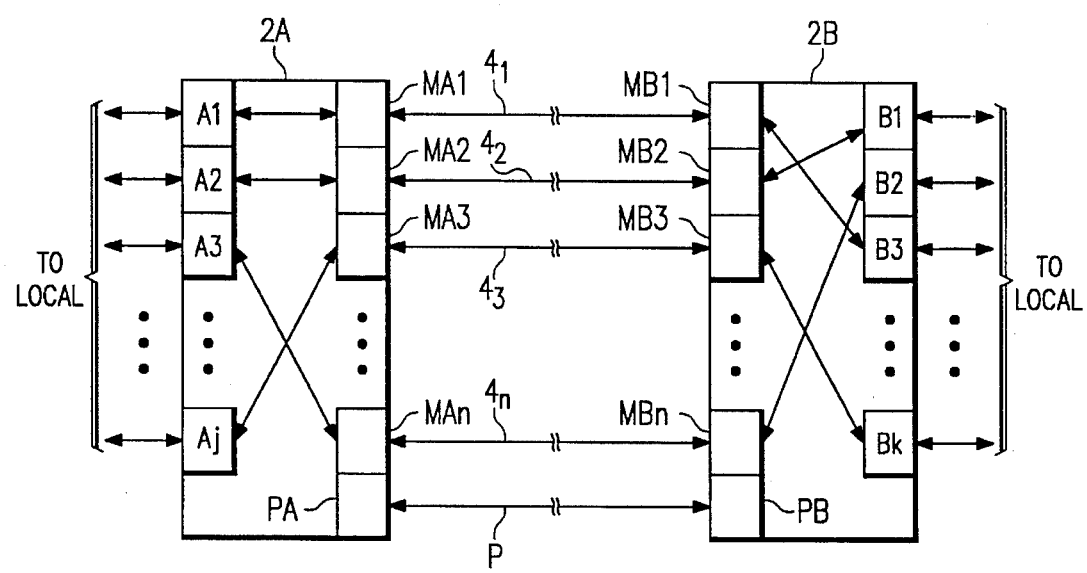
FIG. 1 is an electrical diagram, in block form, of a telecommunications system in which the preferred embodiments of the invention is used.

FIG. 1 illustrates, in block form, a closed telecommunications system within which the preferred embodiment of the invention may be implemented. According to this example, two digital cross-connects 2A, 2B each have a group of member ports in communication with each other over an associated number of routes. Member ports MA1 through MAn of digital cross-connect 2A are in communication with corresponding member ports MB1 through MBn of cross-connect 2B, via paths $4_1$ through $4_n$. The groups of member ports MA1 through MAn and MB1 through MBn comprise the group of ports to be protected by a protection path according to the present invention. By way of example, fifteen such member ports MA, MB (i.e., n=15) may be assigned to a single protection group, protected by a single protection channel.

As is well known in the art, the term "path" refers to a digital data channel that is communicated in a time-division multiplexed fashion along a "line"; as such, a "line" includes many paths, as well as framing and other information concerning line status, synchronization, and the like. Also as is well known in the art, the term "facility" refers to path data as it is received by a switch or cross-connect. As will be apparent from the description herein, the present invention is intended to provide facility protection for telecommunication, in that individual facilities are monitored and switched without requiring switching of and redundancy for entire lines. Of course, the present invention is also capable of protecting against line failures.

In this example, each of paths $4_1$ through $4_n$ are DS-3 paths, communicating digital information between cross-connects 2A, 2B in time-domain multiplexed fashion. Other network elements may be present in the route between cross-connects 2A, 2B, such as fiber optic terminals and the like which further time-domain multiplex the DS-3 communications onto a fiber optic line (e.g., an OC-12 fiber optic line). Since the 1:n group protection provided by the present invention can protect only one of the members of the group at a time, however, it is strongly preferred that each of the member pairs MA, MB be connected to one another by way of physically separate lines (i.e., each path 4 being on a separate line), so that a line failure such as a line cut does not result in a non-protectable failure.

The group facility protection switching according to this embodiment of the invention utilizes communication between cross-connects 2A, 2B to effect the bridging and switching in the manner described hereinbelow. By way of definition, each of cross-connects 2A, 2B, respectively, may also be referred to herein as a "node" (cross-connects 2A, 2B corresponding to nodes A, B, respectively). Accordingly, each of nodes A, B must be aware of the other node's port assignment for corresponding member ports MA, MB; preferably, each of member port numbers MA1 through MAn in node A is connected to a correspondingly numbered member port MB1 through MBn in node B.

Each of cross-connects 2A, 2B also include ports other than the members of the protected group. For example, the 1633 SX digital cross-connect manufactured and sold by Alcatel Network Systems, Inc. can support up to 2048 ports simultaneously. These additional ports A1 through Aj (for cross-connect 2A) and B1 through Bk (for cross-connect 2B) may be in communication with other cross-connects, or with the other cross-connect 2B, 2A in the system of FIG. 1 (either in another protected group or in a non-protected or 1:1 protected manner). The additional ports A, B can provide the communications to member ports MA, MB, respectively, routed in conventional cross-connect fashion.

Also according to the present invention, cross-connects 2A, 2B each have an associated protection port PA, PB, respectively, associated with the member ports in the protected group. Protection ports PA, PB are connected to one another by way of DS-3 protection path P; it is strongly preferred that protection path P be physically separate from paths 4 connected between the members, so that protection capability remains available in the event of a line failure or line cut.

Figure 2:
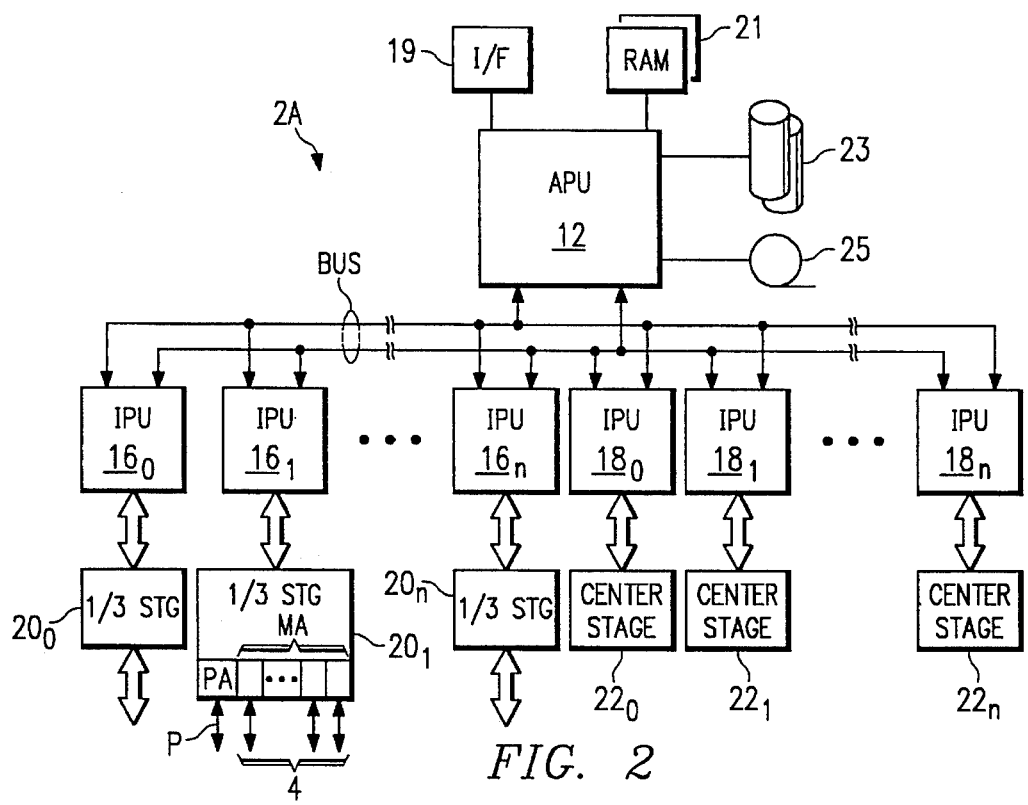
FIG. 2 is an electrical diagram, in block form, of a digital cross-connect system in which the preferred embodiments of the invention may be implemented.

Referring now to FIG. 2, the construction of cross-connects 2A, 2B according to the preferred embodiment of the invention will now be described, using cross-connect 2A as an example. In order for the group facility protection scheme to be fully implemented, both cross-connects 2A, 2B must include the group facility protection capability; accordingly, it is preferable that they be similarly constructed relative to one another. In the preferred construction of cross-connect 2A, the computing and switching processing capability is widely distributed, as in the 1633 SX cross-connect system manufactured and sold by Alcatel Network Systems, Inc., to which the construction of cross-connect 2A shown in FIG. 2 corresponds.

Cross-connect 2A includes administrative processing unit (APU) 12 which is the central data processor within the system. APU 12 is directly connected to conventional storage and input/output functions such as random access memory 21, disk storage 23, tape drive 25, and user interface 19. APU 12 is also connected to bus BUS, which may include one or more information paths within the system. The function of APU 12 is to administer the operation of cross-connect 2A at a relatively high level, and to provide user control and visibility relative to the switching operations provided by cross-connect 2A.

Cross-connect 2A further includes many distributed processors connected to bus BUS, illustrated in FIG. 2 as interface processing units (IPUs) 16, 18. Each of IPUs 16, 18 is a data processing unit of sufficient complexity and performance to perform the functions described hereinbelow, and each may be implemented as a conventional programmable microprocessor, or alternatively as custom logic such as an application specific integrated circuit (ASIC). Each of IPUs 16 are for controlling input and output functions relative to the bidirectional DS-3 ports, and thus control the operation of the member and protection ports of cross-connect 2A when installed into a system as illustrated in FIG. 2. To accomplish this function, each of IPUs 16 is associated with and bidirectionally coupled to one of first/third matrix stage units 20. In this example, each of first/third stages 20 includes a portion of the switching matrix (as will be described hereinbelow), and the appropriate transceiver circuitry to provide sixteen DS-3 ports (fifteen member ports MA1 through MA15, and protection port PA).

In the preferred embodiment of the invention, cross-connect 2A serves as a digital telecommunications switch in a manner realized according to a modified version of the well-known Clos matrix. A preferred version of the modified Clos matrix useful in cross-connect 2A is described in U.S. Pat. No. 5,343,194, issued Aug. 30, 1994, entitled "Methods and System for Immediately Connecting and Reswitching Digital Cross-connect Networks", assigned to Alcatel Network Systems, Inc. and incorporated herein by this reference. According to this matrix realization, switching of a head port to east and west ports is accomplished by way of a three-stage matrix, with the head port coupled to a first stage, and the east and west ports to a third stage. The switching operation is accomplished via a selected center matrix stage which is coupled to the first stage and the desired third stage(s).

According to this example of cross-connect 2A, IPUs 18 are each coupled to bus BUS and to an associated center matrix stage 22. Accordingly, IPUs 16, 18 control the switching operation in a distributed fashion (i.e., without requiring intervention from APU 12), by placing the appropriate first matrix stage in one of first/third stages 20 in communication with a selected center stage 22, which is in turn placed in communication with a third matrix stage in one of first/third stages 20. Each of first/third stages 20 and center stages 22 are preferably implemented as individual ASICs controlled by and in communication with its associated IPU 16, 18, respectively.

As shown in FIG. 2, member ports MA1 through MAn and protection port PA (i.e., node A) are associated with a single one of first/third stages 20, namely first/third stage $20_1$; in this case, sixteen ports are supported by each first/third stage 20 in cross-connect 2A. Accordingly, switching of member ports MA1 through MAn and protection port PA within node A is controlled by a single IPU 16, namely IPU $16_1$. As a result, the preferred embodiment of the invention is implemented in a highly distributed manner, as APU 12 need not be involved in providing the group facility protection of the present invention. This enables the group facility protection to be effected in a very short time such as on the order of 100 msec or less.

The operation of cross-connects 2A, 2B in providing group facility protection will now be described in detail relative to the preferred embodiment of the invention. This operation will be described relative to an example of the response of the system to a signal failure event, as shown in the matrix diagrams of FIGS. 3a through 3h and the flow chart of FIGS. 5a through 5c. The method is preferably implemented in a computer program according to which APU 12 and IPUs 16, 18 operate. It is contemplated that one of ordinary skill in the art will be able to readily implement the method described hereinbelow into a digital cross-connect without undue experimentation, based on the following description.

Figure 3A:
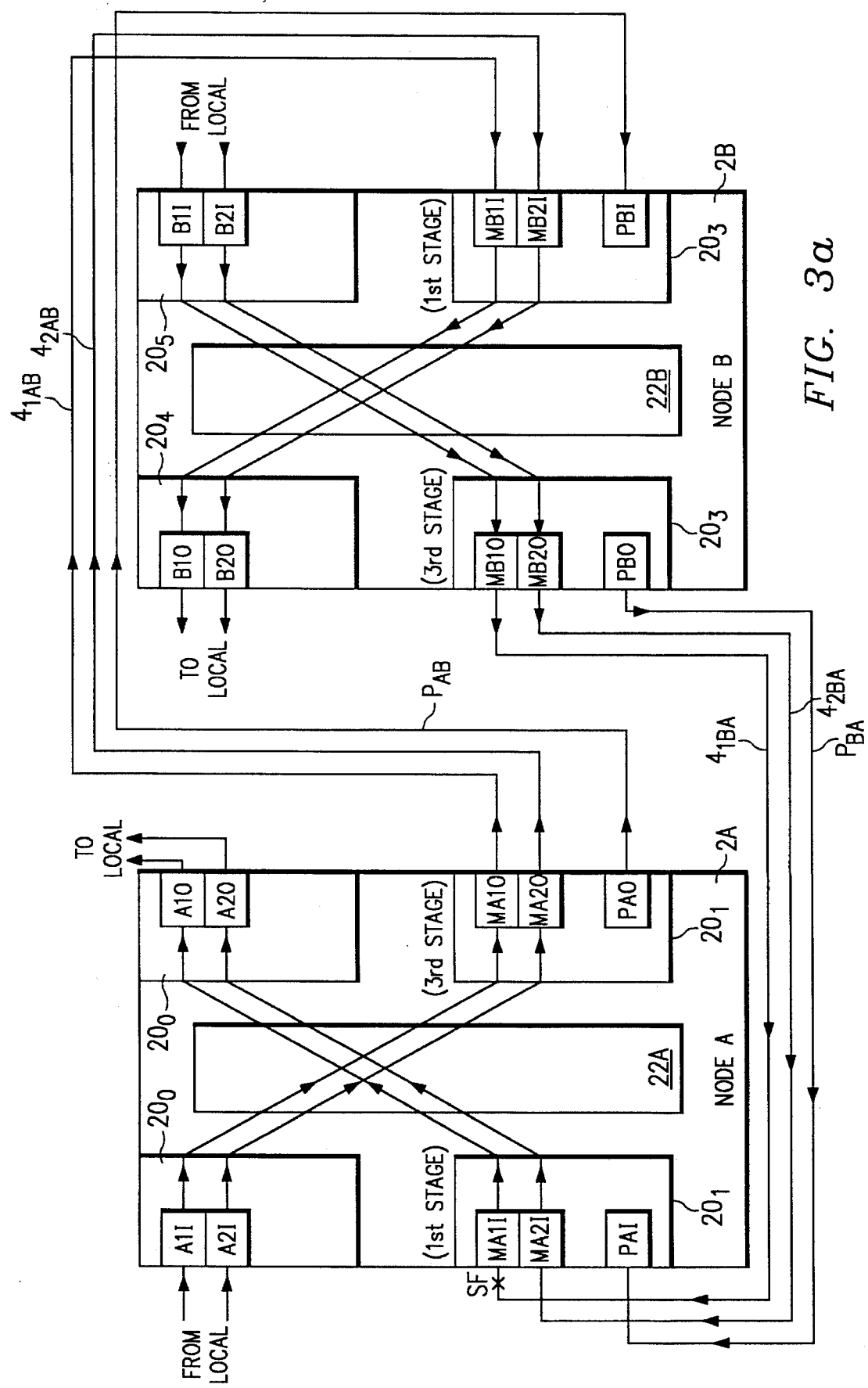
FIGS. 3a through 3h are matrix diagrams of a digital cross-connect, illustrating stages in the operation of the preferred embodiment of the invention responsive to an exemplary signal failure.

FIG. 3a illustrates cross-connects 2A, 2B in a normal state of communication (i.e., no group facility protection switching effected) with one another, for the example of a single group of paths protected according to the present invention. Of course, as noted above, other paths between cross-connects 2A, 2B may be in communication with one another and with other networks and network elements. In addition, network elements such as FOTs, drop/add boxes and the like may be in place between cross-connects 2A, 2B, but are not shown in FIG. 3a for the sake of clarity.

Referring first to cross-connect 2A, local transmissions which are to be communicated to cross-connect 2B by way of group protected facilities are received by first/third stage $20_0$ at head input ports A1I, A2I. First/third stage $20_0$ serves as a first stage in the Clos matrix at this point, and communicates the received transmissions, via center stage 22A, to first/third stage $20_1$ serving as the third stage for this transmission. First/third stage $20_1$ connects the signals from ports A1I, A2I to member output ports MA1O, MA2O, respectively, for transmission as a DS-3 facility to cross-connect 2B via paths $4_{1AB}$, $4_{2AB}$, respectively (the nomenclature $4_{1AB}$, for example, indicating the simplex side of path $4_1$ for communications from cross-connect 2A to cross-connect 2B).

Member output ports MA1O, MA2O (and their corresponding member input ports MA1I, MA2I) constitute the members of the group for which facility protection is to be effected by the present invention. As noted above, the number of members of the group may be much larger than two, such as up to fifteen protected members; for the sake of clarity, the example illustrated in FIG. 3a shows two member ports as being in the protected group. Associated with member output ports MA1O, MA2O is protection output port PAO, which is implemented in first/third stage $20_1$ and connected to protection path $P_{AB}$.

The facilities transmitted on paths $4_{1AB}$, $4_{2AB}$, $P_{AB}$ are received by cross-connect 2B at member input ports MB1I, MB2I, and protection input port PBI, respectively, which are implemented at first/third stage $20_3$. This portion of first/third stage $20_3$ serves as the first stage of the Clos matrix, and communicates the received facilities from member input ports MB1I, MB2I through center stage 22B to first/third stage $20_4$ (in this example), which presents the received transmission to the local side of cross-connect 2B via head output ports B1O, B2O, respectively. In the normal communication state of FIG. 3a, protection input port PBI is isolated from further communication to within cross-connect 2B.

As shown in FIG. 1, the communication between cross-connects 2A, 2B is of the full duplex (bidirectional) type between individual member ports. Conversely, therefore, cross-connect 2B receives a transmission from its local side at input ports B1I, B2I in first/third stage $20_5$, which in turn communicates the received transmission to first/third stage $20_3$ via center stage 22B. First/third stage $20_3$ (this portion serving as a third stage of the Clos matrix) completes the connection of input ports B1I, B2I to member output ports MB1O, MB2O, respectively, for communication to cross-connect 2A via paths $4_{1BA}$, $4_{2BA}$, respectively. In addition, protection output port PBO is implemented at first/third stage $20_3$, and is connected to path $P_{BA}$.

Cross-connect 2A receives paths $4_{1BA}$, $4_{2BA}$, $P_{BA}$ at member input ports MA1I, MA2I, and protection input port PAI, respectively, implemented in first/third stage $20_1$ (this portion thereof serving as the first stage of the Clos matrix). First/third stage $20_1$ communicates the facilities received at member input ports MA1I, MA2I to head output ports A10, A20, respectively, located at first/third stage $20_0$, and thus to the local side of cross-connect 2A, completing the full duplex connection between cross-connects 2A, 2B. Protection input port PAI is isolated from center stage 22 in the normal communication state illustrated in FIG. 3a.

Certain constraints regarding the assignment of member ports M to certain first/third stages 20 should be noted from FIG. 3a. Firstly, to effect rapid group facility protection switching, the member input ports and member output ports in the same protected group are implemented within the same first/third stage 20 within a single cross-connect 2. Referring to FIG. 3a, member input ports MA1I, MA2I and member output ports MA10, MA20 are all implemented within the same first/third stage $20_1$ in cross-connect 2A, and as such are under the control of a single IPU $16_1$ (see FIG. 2). Similarly, member input ports MB1I, MB2I and member output ports MB10, MB20 are all implemented within the same first/third stage $20_3$ in cross-connect 2B, under the control of a single IPU $16_3$. However, it is neither essential nor important that the head ports A, B (i.e., not members of the protected group) have their input and output sides physically present within the same first/third stage 20, as is the case in cross-connect 2B of FIG. 3a (for input ports B1I, B2I and output ports B10, B20). In addition, it is not necessary that the group of head ports associated with the group protected transmission be located in the same first/third stage 20; for example, head input ports A1I and A2I may be implemented in different first/third stages 20 from one another.

In addition, as will be apparent from the description hereinbelow, the member ports M of the protected group are preferably assigned in a corresponding manner with one another, so that communication concerning the group facility protection bridging and switching to be effected is facilitated. Accordingly, in the example of FIG. 3a, member output ports MA10, MA20 of cross-connect 2A are connected to member input ports MB1I, MB2I, respectively, of cross-connect 2B; conversely, member output ports MB10, MB20, are connected to member input ports MAiI, MA2I, respectively. Protection input and output ports PAI, PAO, PBI, PBO are similarly connected to one another.

In the example of the operation of the preferred embodiment of the invention described hereinbelow, a signal fault SF is occurring in the facility received at member input port MA1I of node A (i.e., cross-connect 2A), as shown in FIG. 3a. Signal fault SF corresponds to a "hard" failure for the facility, indicated by a particular signal being transmitted therealong. Examples of conventional hard failure signals include loss-of-signal (LOS), loss-of-frame (LOF) and the alarm indication signal (AIS). As is well known, the AIS signal is a signal transmitted by the first network element receiving an alarm signal such as LOS or LOF, to prevent the propagation of the LOS/LOF signal by multiple network elements, thus facilitating identification of the failing location in the network.

The preferred embodiment monitors individual facilities, rather than entire lines, and thus can effect switching of individual paths within a line based on their status. As a result, soft errors may also be monitored by the present invention, including excessive error rate conditions. These soft error conditions relate to measured errored seconds over a period of time; examples of such conditions are provided in the table hereinbelow:

10 errored seconds (ES) in 15 minutes; or

864 ES in 1 hour; or 4 severely errored seconds (SES) in 24 hours where an ES is defined as any second within which a coding violation is detected, and where an SES is defined as any second in which more than 44 coding violations are detected (i.e., an error rate of greater than $10^{-6}$ sec$^{-1}$). These soft error thresholds preferably differ in type and in degree from conventional performance monitoring thresholds, so that facility switching may be used to avoid degradation in the grade of service for the facility. These threshold error rates may also be administrable, allowing the system operator to increase or decrease the sensitivity of facility protection switching by adjusting the threshold values via APU 12. As hard error conditions (LOS, LOF, AIS) are separately monitored, these threshold definitions are purely for errored seconds due to coding violations, and do not include errored seconds due to the presence of LOS or AIS conditions (which are included in the conventional errored seconds definitions).

It may be preferable in many installations, however, to not monitor and effect group facility protection based on excessive error rates, but to provide group facility switching only due to hard failures. This is because only one protection path is provided for the multiple member paths in the group, and because the facility switching according to this invention utilizes communication between nodes to effect the desired bridge and switch conditions. As a result, it is preferable to maximize the availability of the protection path, so that the time required to switch to the protection path in the event of a hard failure is minimized. As traffic over the protection path increases, such as would occur in the event of error rate initiated switching, the likelihood increases that a hard error facility protection switch would require restoration of the protection path traffic to its original member port, which increases the switching time required. As such, initiation of switching due only to hard failures greatly improves the switching time performance.

The following description will thus be limited to the case of group facility protection switching responsive to a hard failure condition (LOS, LOF, AIS). It is contemplated, however, that insertion of error rate thresholds into the monitoring and switching routine described herein could readily be effected by one of ordinary skill in the art having reference to this specification and the drawings.

Figure 5A:
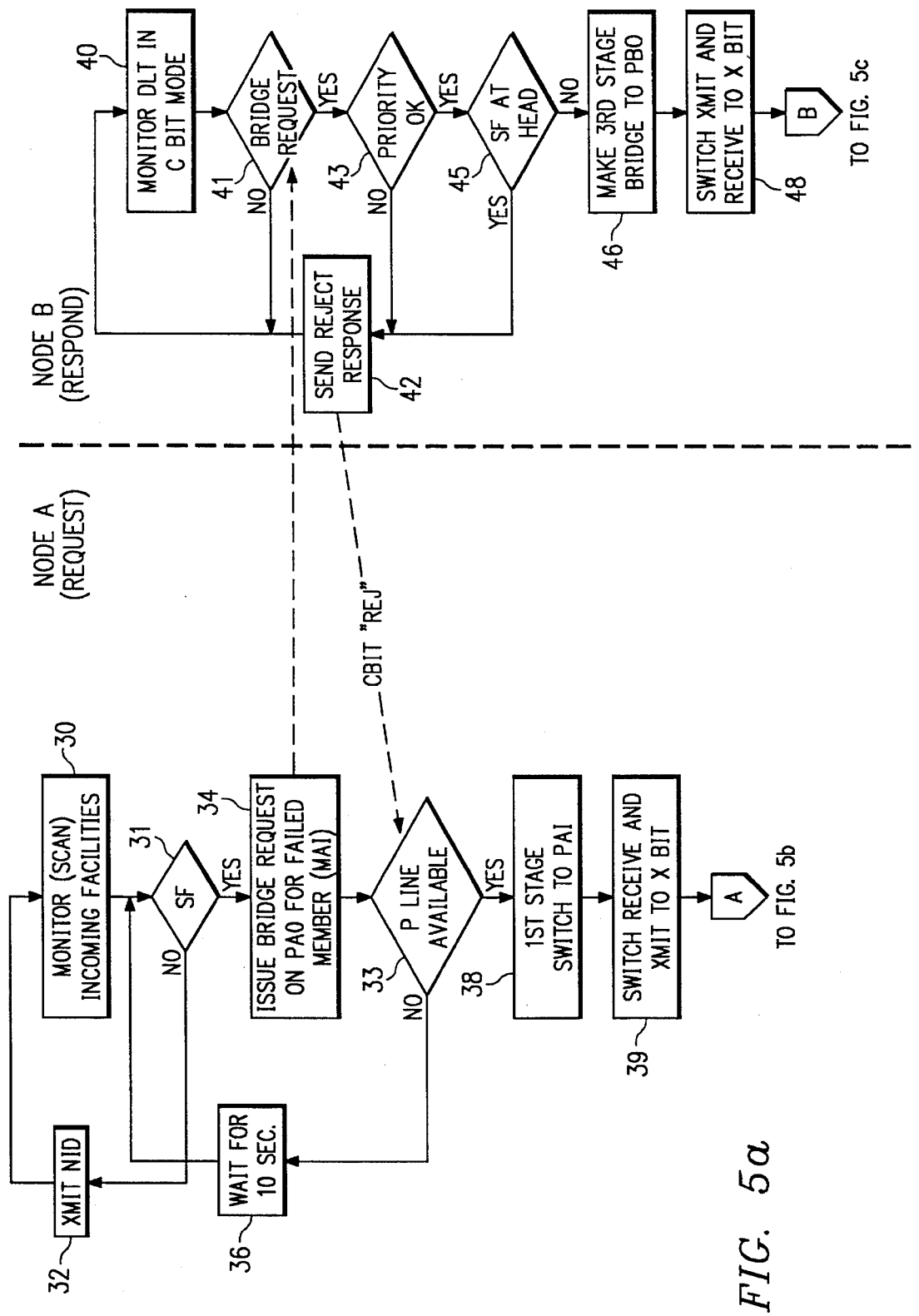
FIGS. 5a through 5c are a flow chart illustrating the operation of the preferred embodiment of the invention in the manner illustrated in FIGS. 3a through 3h and 4.
Figure 5B:
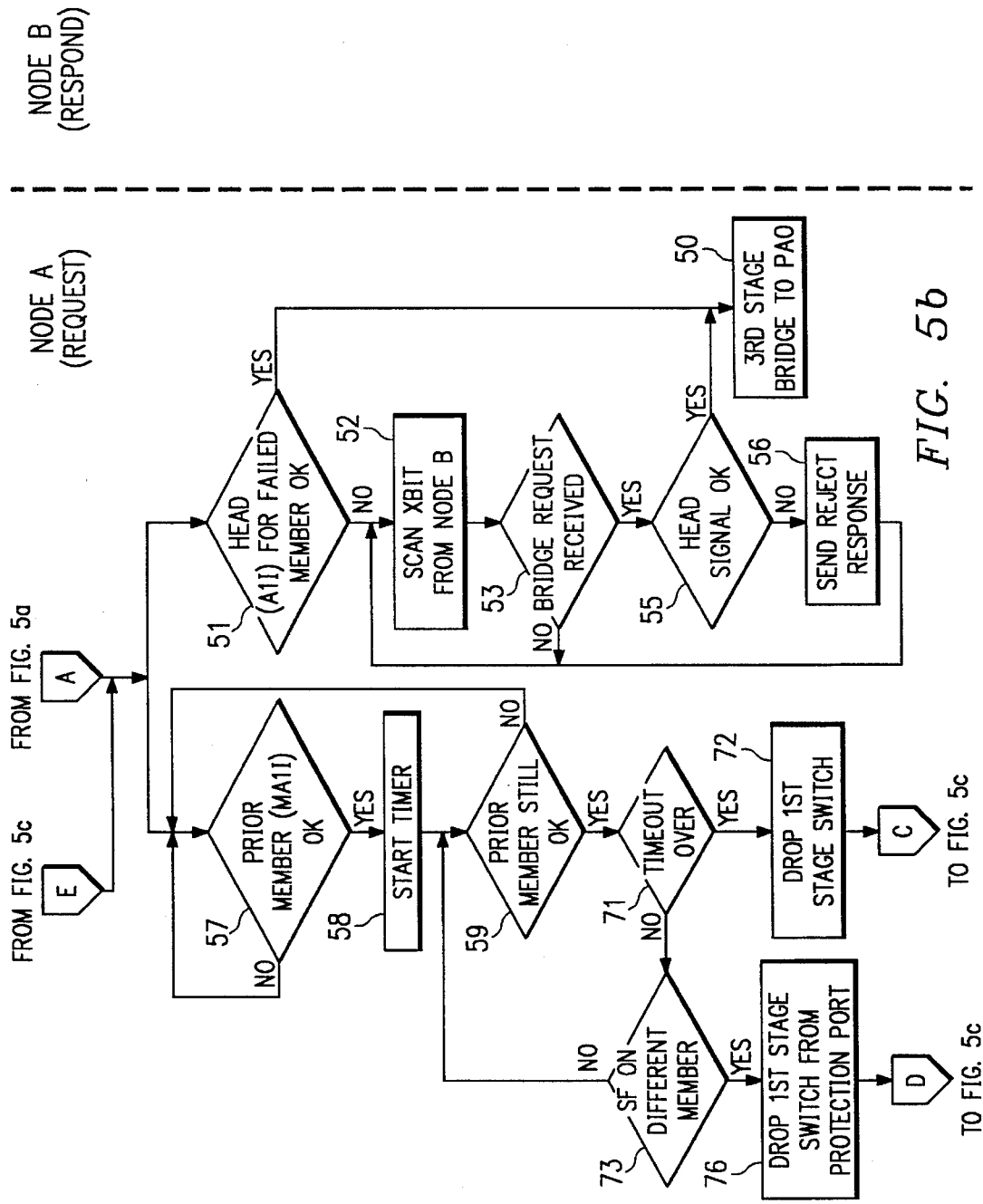
Figure 5C:
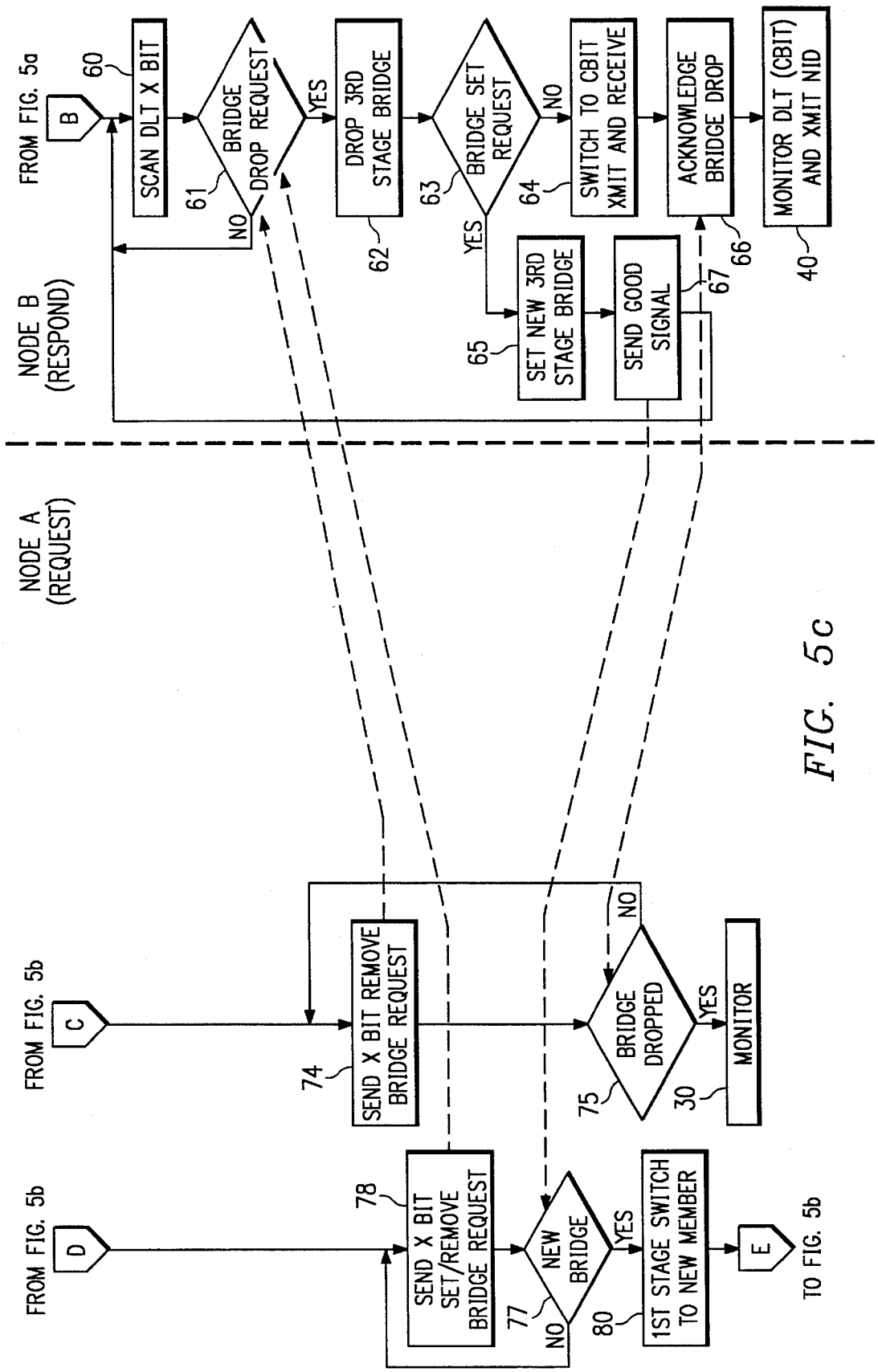

FIGS. 5a through 5c present a flow chart of the method of the preferred embodiment of the invention, relative to an example of the group facility protection switching in resolving a signal failure condition. In this flow chart, the operations of both the requesting node and the mate node (or responding node) are separately illustrated. It is to be understood, however, that as both cross-connects 2A, 2B are similarly constructed to operate in the same way to effect this switching, the responding node will also be operating as a requesting node, and vice versa, in substantially a contemporaneous manner with the operations illustrated in FIGS. 5a through 5c (both nodes A and B have the request and respond functions shown in FIGS. 5a through 5c). This contemporaneous operation will often occur, given that many facility and line failures have bidirectional effect. In the group facility protection scheme according to the preferred embodiment of the invention, however, one of the nodes will detect the signal failure condition prior to the other. Therefore, for purposes of clarity of description, node A (cross-connect 2A) will be the first node to detect the signal failure in this example, and will be the requesting node; node B (cross-connect 2B) will thus be the responding node.

In process 30 of FIG. 5a, node A performs a periodic scan of those member input ports MAI of the protected group to determine if a signal failure condition (LOS, LOF, AIS) is being received. The period of the scan is preferably selected in a manner consistent with the switching time specification; for example, if facility protection switching is to be effected within 100 msec of a fault, a scan period of 20 msec will allow 80 msec for response to a detected fault. In decision 31, the result of the scan of process 30 is determined; if a signal failure is found, control passes to process 34 to begin the switching process. This scanning is performed by IPU $16_1$ controlling first/third stage $20_1$.

If no signal failure is detected, process 32 is performed by which node A maintains transmitting of the NID condition on protection path P, indicating that protection is not required. As discussed hereinabove, the bandwidth of DS-3 systems is insufficient to allow use of entire bytes of information between nodes, as is used for fiber optic line protection according to the SONET standard. According to the preferred embodiment of the invention, certain bits (e.g, the C-bits) in the DS-3 data frame transmitted along protection path P are used to communicate requests, responses, identifying information, and status information.

According to the preferred embodiment of the invention, the DLt bits available in both the X-bit and C-bit channels of a standard DS-3 data frame are used to communicate group facility protection information over protection path P. As more bits are available in the C-bit channel than in the X-bit channel per frame, the C-bit channel is used for such communication when available; the X-bit channel is then used if the DS-3 data are not an idle signal. A description of the DS-3 data frame standard, including the definition of the C-bits and X-bits, may be found in the American National Standard ANSI T1-107a.1990 (supplement of 1990).

Process 32 is performed by IPU $16_1$ via first/third stage $20_1$, to present an "NID" signal over path $P_{AB}$ via the C-bits; the frame transmitted also includes the standard DS-3 "idle" signal. Accordingly, node B is able to determine from node A performing process 32, that the protection path P is available (from node A to node B).

In the event a signal failure is detected, such as signal failure SF on the facility received by member input port PA1I, process 34 is performed by which first/third stage $20_1$ issues a bridge request signal from protection output port PAO to node B. This bridge request signal is communicated by way of the C-bit channel, and indicates both that a bridge is requested and also the member input port at which the signal failure SF is detected (in this case member input port MA1I).

Meanwhile, node B has been performing process 40 and decision 41, by which the DLt bits in C-bit mode are monitored periodically to determine if a bridge request or other signal to which node B is to respond is present. If no bridge request is received, monitoring process 40 continues. However, if a bridge request signal is received over the C-bit channel, processing of the request begins with decision 43, in which the priority of the request is determined.

Various priorities are assigned to bridge requests according to the preferred embodiment, to allow for flexibility of use of the function and for human operator intervention. An example of such priorities are as follows:

| Function | Priority |
|---|---|
| PROTECTION LOCKED OUT | HIGHEST |
| FORCED SWITCH | SECOND |
| SF CONDITION DETECTED | THIRD |
| MANUAL SWITCH | FOURTH |
| WAIT-TO-RESTORE | LOWEST |

The Protection Locked Out state corresponds to the condition where APU 12 has disabled the group facility protection; in this case, if an SF condition is detected, no bridging or switching will be effected. Locking out of protection may be enabled manually, or also automatically upon detection of an excessive switching rate for a member, to avoid oscillation. A forced switch is a high priority manual switch; a subsequent SF condition will also be ignored in this case. Detection of an SF condition will effect a switch if the protection path is idle, or will override a prior use of the protection path if initiated as a result of a normal manual switch or a switch in wait-to-restore mode (as will be described hereinbelow).

If the SF condition priority is insufficient to override the priority of the current use of the protection path (if the protection path is not idle), process 42 is effected by node B, and a reject response is sent from protection output port PBO to protection input port PAI over the C-bit channel; node B then returns to monitor state (process 40).

If the priority of the SF condition is adequate, decision 45 is performed by which the responding node interrogates the head port associated with the requested bridge to ensure that no hard failure is present thereat. In this example, IPU $16_5$ of node B examines the status of head port B1I, to determine if a good signal is present thereat; if not, the reject response is sent by protection output port PBO via the C-bit channel to node A (process 42).

In either case, if the reject response signal is received by node A over the C-bit channel, decision 33 returns a negative response and wait state 36 is entered. After elapse of the wait period (e.g., 10 seconds), the bridge request of processes 31 and 34 is repeated by requesting node A, to determine if the protection path is clear and if the head input signal at node B is in service.

If input head port B1I has a valid signal, process 46 is then performed by which IPU $16_3$ in node B effects a third stage bridge (3SBR) in first/third stage $20_3$; since both ports MB10 and PBO are within the same first/third stage $20_3$ (and thus within the same ASIC, in this example), this bridge may be performed by a single write operation from IPU $16_3$ to first/third stage $20_3$. This operation bridges the path from head input port B1I to both member output port MB10 and also to protection output port PBO, providing a "good" signal over path $4_{PBA}$ to node A. Decision 33 performed by node A monitors for a transition from an idle signal to a "good" signal over protection path P; node A is also able to detect a reject signal over path P as well as a message indicating that an idle signal has been bridged from the head port in node B. After its bridging of the head signal to protection path P, node B switches both of its transmit and receive capabilities (at protection ports PBI, PBO) to the X-bit channel, as the C-bit channel will be occupied by the transmission thereover (i.e., the DS-3 data will no longer be an idle signal). Process 60 and 61 (shown in FIG. 5c) are then performed by node B, by which the DLt bits in the X-bit channel are monitored at protection input port PBI, to determine if a bridge release signal is being received; the issuance of and response to such a signal will be described in detail hereinbelow.

Figure 3B:
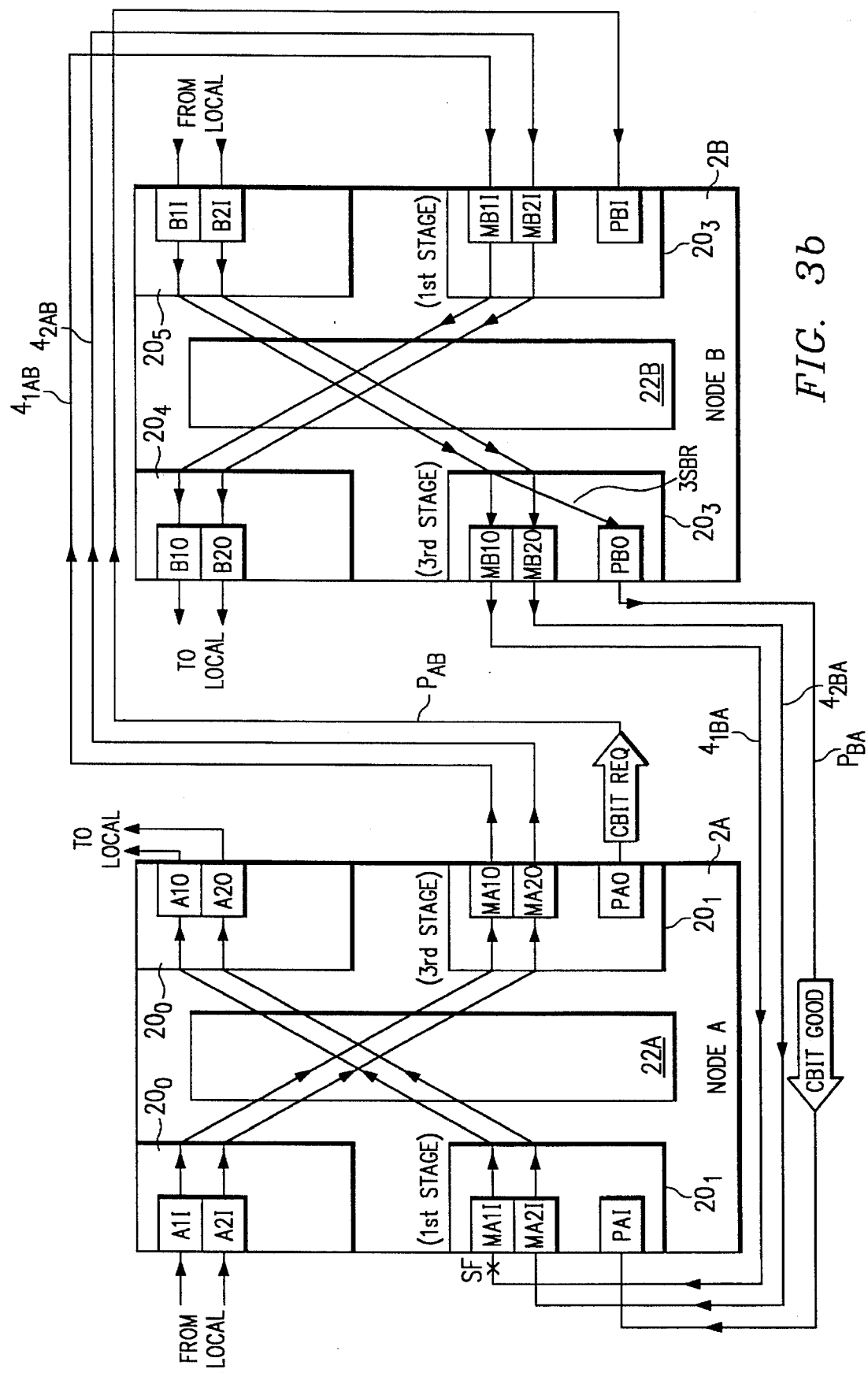

This state of the system in performing the third-stage bridge at node B is illustrated in FIG. 3b; the third stage bridge is indicated by 3SBR at first/third stage $20_3$. FIG. 3b also illustrates the direction of travel of the bridge request and "good" signals over paths $P_{AB}$ and $P_{BA}$, respectively.

Upon receipt of the "good" signal at protection input port PAI, in process 38 node A performs a first stage switch at first/third stage $20_1$, switching the facility now being received at protection input port PAI to center matrix stage 22A in place of the failed facility previously received at member input port MA1I. As in the case of the third stage bridge in node B, the first stage switch may be accomplished by a single write operation by IPU $16_1$ to first/third stage $20_1$, as both the protection input port PAI and member input port MA1I (from which traffic is to be switched) are resident therein. Following the first stage switch of process 38, node A switches both of its receive and transmit functions at protection ports PAI, PAO, respectively, from the C-bit channel to the X-bit channel in process 39.

Figure 3C:
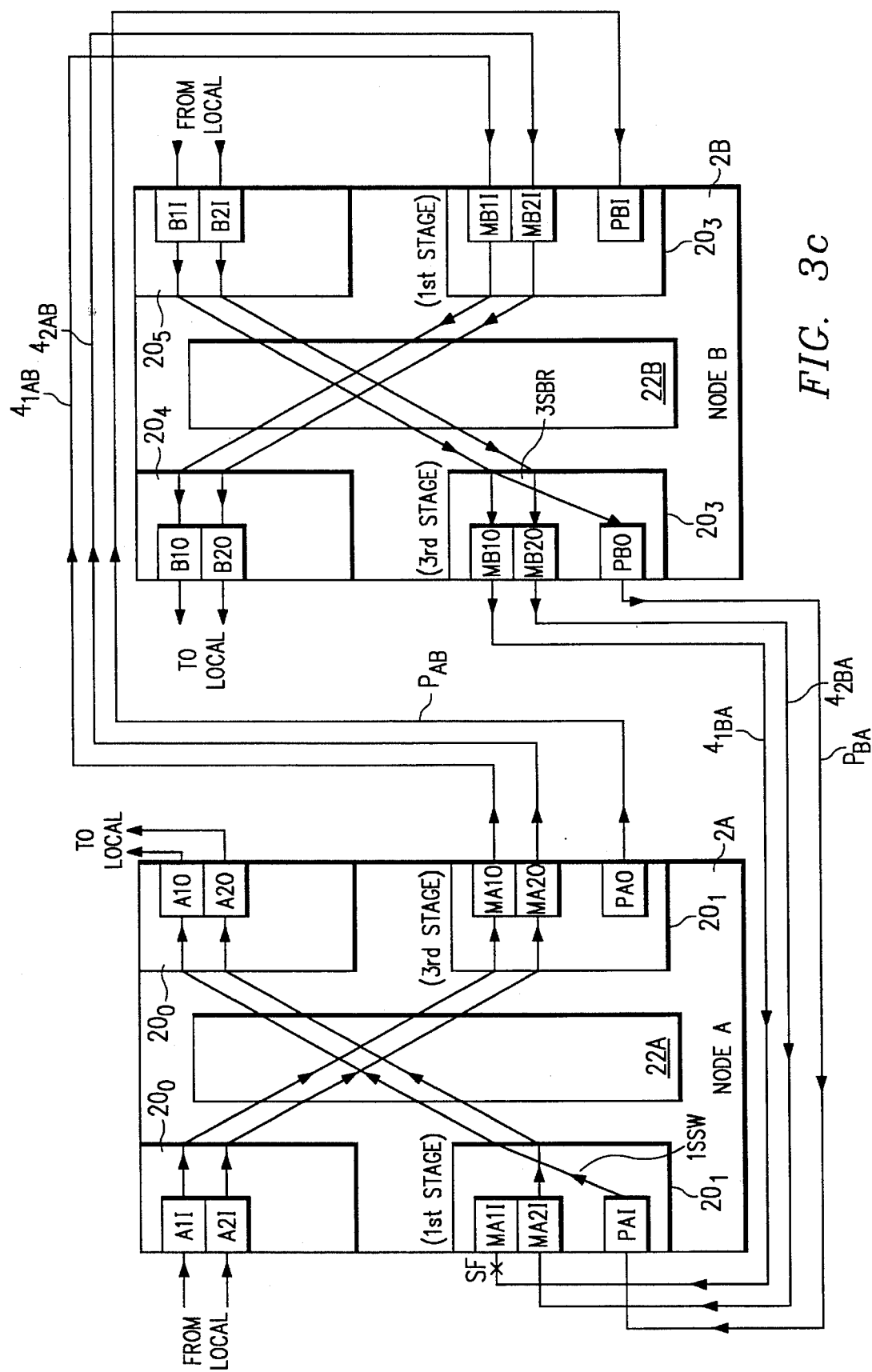

The result of this first stage switch (1SSW) is illustrated in FIG. 3c. As is evident from FIG. 3c, a valid facility is now being received by node A via protection path $P_{BA}$, and is routed to head output port A1O in the same manner as the facility that was previously received at member input port MA1I, except that the signal failure SF is avoided because of first stage switch 1SSW. However, the switched facility continues to be broadcast by node B over both protection path $P_{BA}$ and also member path $4_{1BA}$, and is still received at member input port MA1I. As will be evident from the following description, monitoring of the facility at member input port MA1I continues, so that reversion to the normal state can be effected at the appropriate time.

Referring now to FIG. 5b, after performing the first stage switch (processes 38, 39), in decision 51 node A next interrogates the head input port associated with the member for which the first stage switch was effected and, if the signal at the head port is valid, automatically effects its own third stage bridge to protection. This process is based on the assumption that most signal failures are bidirectional in nature; as such, if no bridge request has yet been received at the protection input port PAI of node A at the time of the first stage switch of process 38, it is highly likely that one will be so received shortly. In addition, since protection path P is already busy in the direction from node A to node B, and cannot be assigned to protect another port, there is no danger in performing such a bridge even if unnecessary.

The interrogation of decision 51 is performed by the IPU 16 associated with the first/stage 20 for the corresponding member input port. In this example, IPU $16_0$ interrogates first/third stage $20_0$ to determine if head input port A1I is receiving a good signal. If so, process 50 is performed by which a third stage bridge is effected at first/third stage $20_1$, bridging the traffic from head input port A1I to both member output port MA1O and protection output port PAO. Accordingly, at such time as node B issues a bridge request signal to node A for its member input port MB1I, a "good" signal will already be present on protection path $P_{AB}$, allowing node B to immediately effect its first stage switch from member input port MB1I to its protection input port PBI.

If "good" signal is not present at head input port A1I, node A enters process 52 in which it scans the X-bit channel at protection input port PAI. If no bridge request is received at protection input port PAI (decision 53), the scanning of process 52 will continue. If a bridge request for the same member, or even for a different member in the group, is received at protection input port PAI from node B (decision 53), node A again checks the status of the associated head input port A1I in decision 55; if the failed condition persists, the third stage bridge is not performed and a reject response is sent to node B (process 56). If the signal is good at head input port A1I, however, node A effects a third stage bridge in process 50.

Figure 3D:
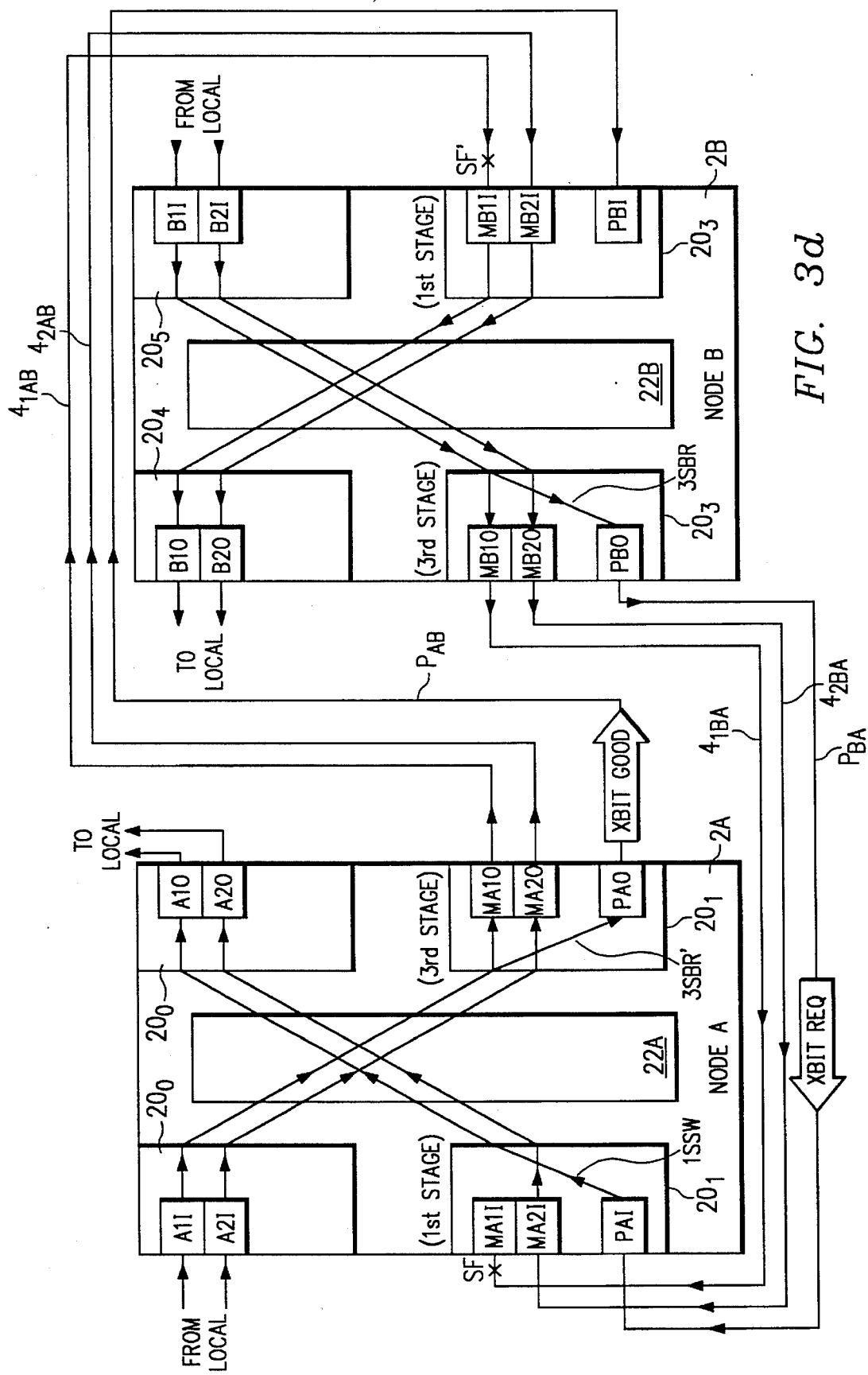
Figure 3E:
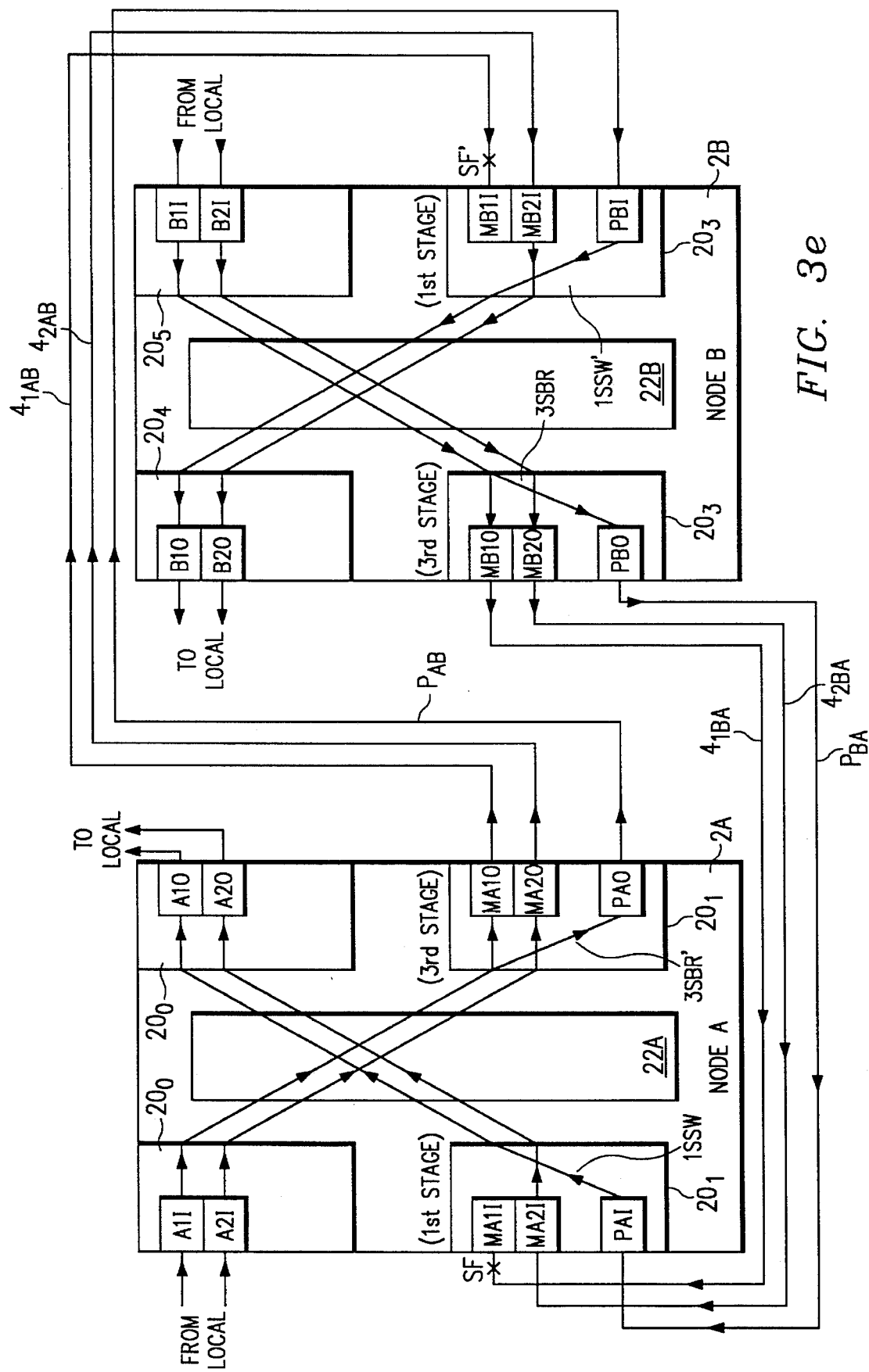

FIG. 3d illustrates the result of the third stage bridging by node A performed by this process, in the event of subsequent signal failure SF' at member input port MB1I. As noted above, node A has effected third stage bridge (3SBR') at first/third stage $20_0$ either responsive to head port A1I receiving a good signal, or to a bridge request signal received on the X-bit channel from node B at protection input port PAI. This third stage bridge 3SBR' is detected, at protection input port PBI of node B, as "good" signal on from protection path $P_{AB}$, responsive to which node B effects its first stage switch at first/third stage $20_3$, connecting protection input port PBI to the head output port B1O previously associated with protected member input port MB1I at which signal failure SF' was detected. This state is illustrated in FIG. 3e, showing an example of full duplex facility protection switching according to the preferred embodiment of the invention. The hard failure conditions caused by signal failures SF, SF' are thus avoided, with the facility traffic active over the protection paths and ports.

Upon each of the switching and bridging events noted above, it is desirable that the IPU 16 responsible for the bridge or switch notify APU 12 of the event, and the reason for its occurrence. This provides visibility of the group facility protection function to the system operator, and also allows APU 12 to log the frequency and reasons for such switching.

As noted above, since the present system provides 1:n group facility protection, it is highly desirable that the facility protection switching revert back to the normal state when possible, so that the protection path is open and not occupied in case of a signal failure at another member port, so that the facility switching may be rapidly effected in such case. It is of course also highly desirable that the reversion to the normal state not be effected until such time as the member path is again stable. The following describes the reversion procedure according to this preferred embodiment of the invention.

According to this embodiment of the invention, each node that makes a first stage switch begins monitoring the member port from which the first stage switch was made, to determine if the incoming facility thereat has returned to a good signal condition. In the example of FIGS. 5a through 5c, after the first stage switch has been performed by node A in process 38 (and communication switched to the X-bit channel in process 39), node A monitoring of member port MA1I from which the first stage switch was made. Decision 57 is first performed by which, in this example, IPU $16_1$ monitors the incoming facility at member port MA1I; if the incoming facility is a good signal, the timeout timer (located in IPU $16_0$ associated with the protected group) is started in process 58. If the prior member port is still in an error condition, decision 57 will be periodically performed to continue the monitoring state; meanwhile, the first stage switch 1SSW will remain in place to receive the valid facility over protection path P.

Once the prior active member input port MA1I is detected as carrying a good signal, node A begins its wait-to-restore period. As noted above, the wait-to-restore switch and bridge has the lowest priority of all bridges, and as such another SF condition detected on another member will have a higher priority. The wait-to-restore loop consists of three decisions 59, 71, 73. Decision 59 scans the prior member port (MA1I in this example) to ensure that it is still receiving a good signal; if the prior member port is in an error condition, control returns to the loop of decision 57 until a good signal condition is again detected. Decision 71 determines if the timeout period (e.g., five minutes) has elapsed; if so, control passes to the reversion routine as will be described hereinbelow.

If the timeout period has not elapsed, decision 73 is performed by which the other member input ports in the protected group are interrogated. In this example, IPU $16_0$ of node A will interrogate the other member input ports at first/third stage $20_0$ (e.g., member input port MA2I) to determine if an LOS, LOF, or AIS condition is present thereat. If a signal failure is detected at this time, and because the prior failed member port is now in a good condition (even if not stable over the timeout period), according to the preferred embodiment of the invention a new first stage switch and third stage bridge will be effected, so that the member input port now having the signal failure is switched to the protection path. The process of establishing the new switch will be explained in detail hereinbelow, after the following discussion of the reversion process.

Figure 3F:
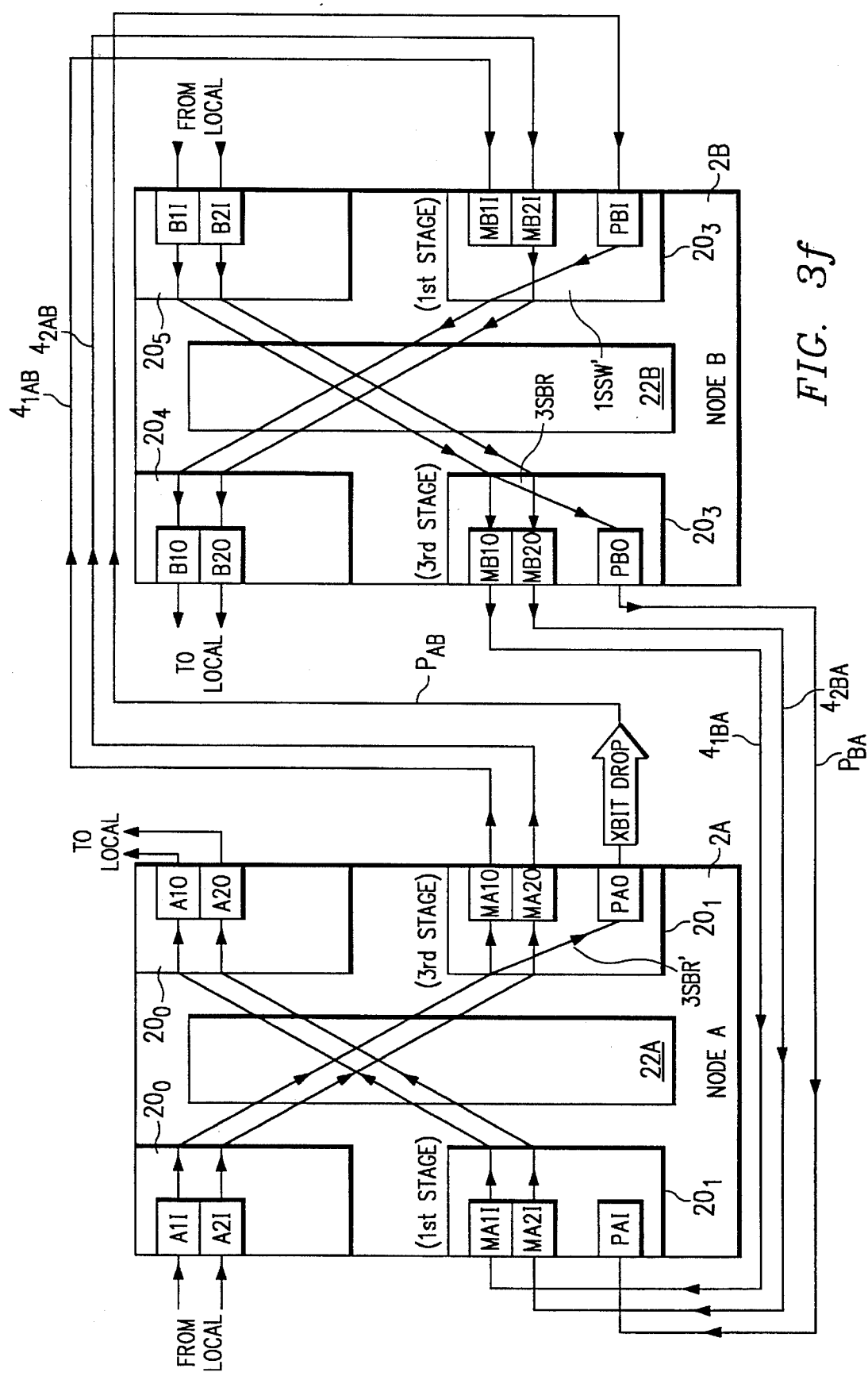

If no signal failure condition is detected on other member input ports, the timeout loop of decisions 59, 71, 73 continues until the timeout period elapses. Upon elapse of the timeout period during which a good facility has been received at the prior member input port MA1I, process 72 is performed in which the first stage switch in first/third stage $20_0$ is dropped. Referring now to FIG. 5c in combination with FIG. 5b, process 74 is then performed by which node A sends to node B a drop bridge request by way of the X-bit channel from protection output port PAO. The drop bridge request signal is sent continuously until a bridge drop acknowledge signal is detected (decision 75). The condition of the system with first stage switch 1SSW dropped is illustrated in FIG. 3f.

Figure 3G:
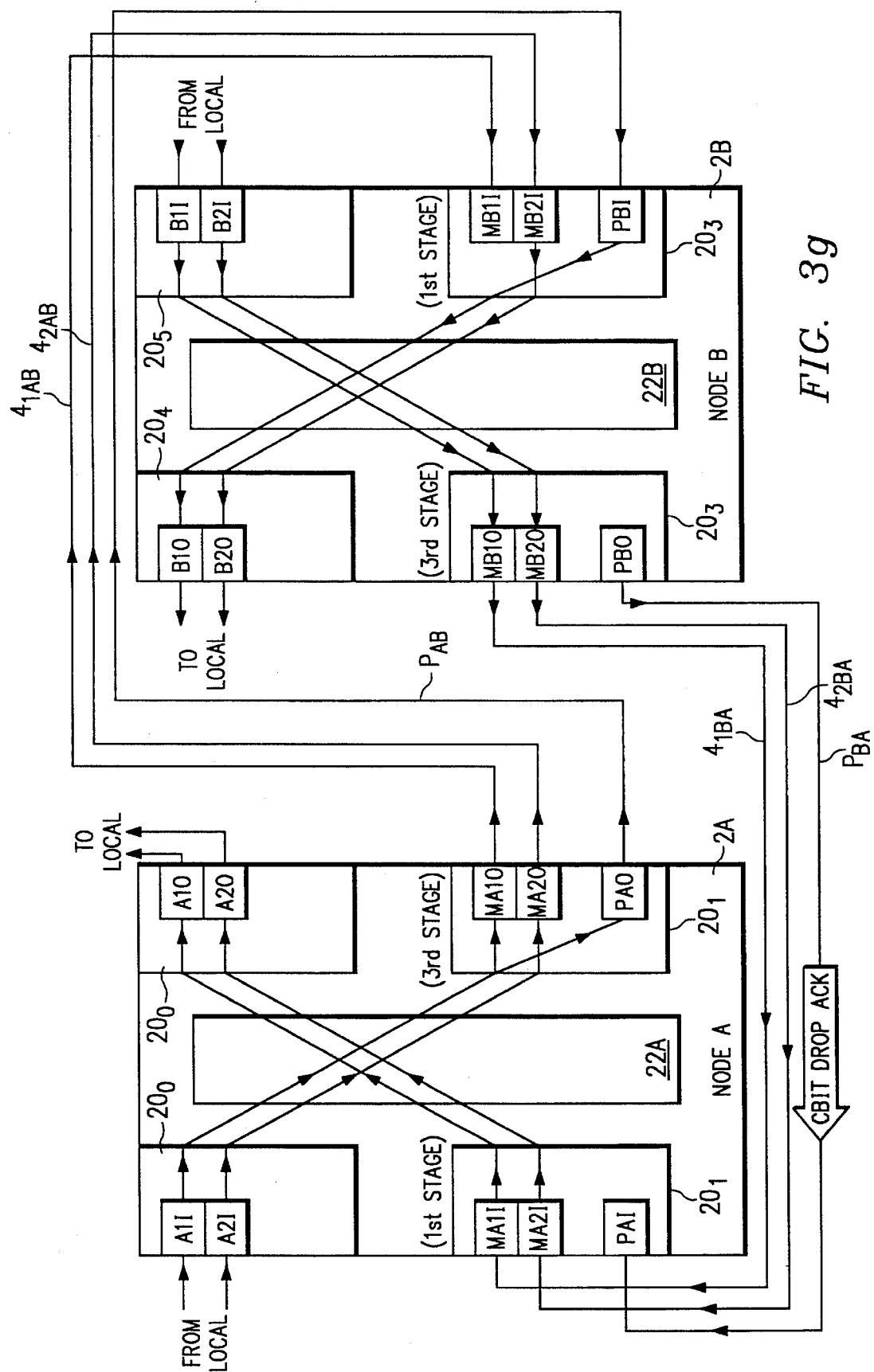

Referring to the node B side of FIG. 5c, upon receipt of the bridge drop signal on the X-bit channel, decision 61 returns a positive result and process 62 is performed in which node B drops the third stage bridge at first/third stage $20_3$. Decision 63 determines if a new bridge set request has been received (which is not the case in the event of timeout elapsing), and is followed by process 64 in which node B switches its transmit and receive nodes to the C-bit channel. Node B then acknowledges the bridge drop to node A by way of the C-bit channel from protection output port PBO, and re-enters the monitored state (process 40). This condition of the system is illustrated in FIG. 3g.

Upon receipt of the drop bridge acknowledgement signal on path $P_{BA}$ at protection input port PAI, node B also enters the monitor state (process 30). The protection path between node B and node A is thus dropped, and is now available in the event of another failure.

Figure 3H:
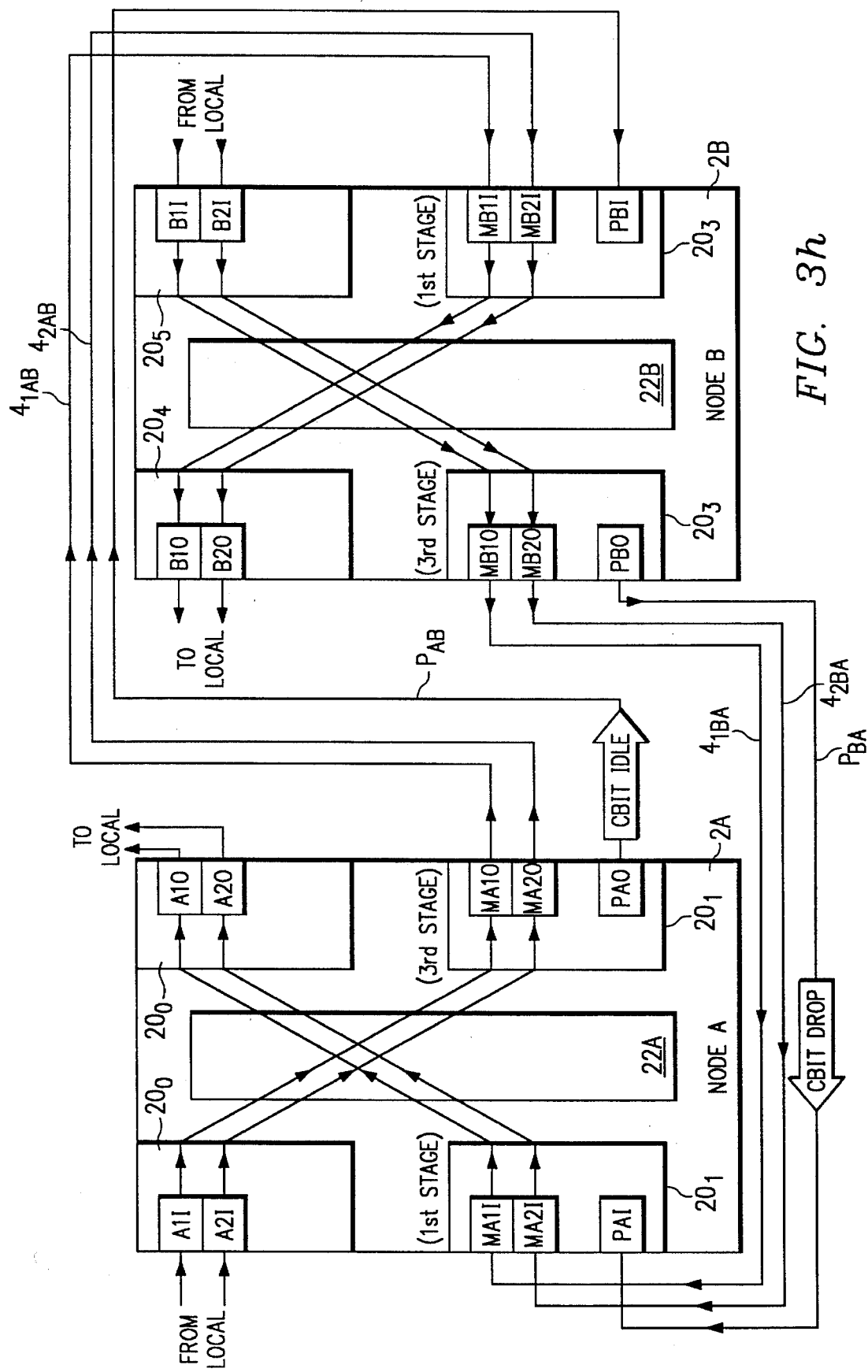

As discussed above, the failure illustrated in FIG. 3e was a full duplex failure. In this example, however, node A detected the signal failure first, and as such its timeout period elapsed prior to that of node B. As node B has undergone a similar process in requesting the third stage bridge in node A and itself performing a first stage switch, node B will drop its first stage switch 1SSW' upon elapse of node B's timeout period, and request that node A drop its third stage bridge 3SBR by way of a C-bit signal. Upon receipt of the drop bridge request, node A will drop third stage bridge 3SBR, and issue an idle signal on the C-bit channel from protection output port PAO. The system will then revert to the normal full-duplex condition, as illustrated in FIG. 3h. Both of nodes A and B will be in their send and receive monitor modes (processes 30, 40), awaiting detection of the next failure.

Figure 4:
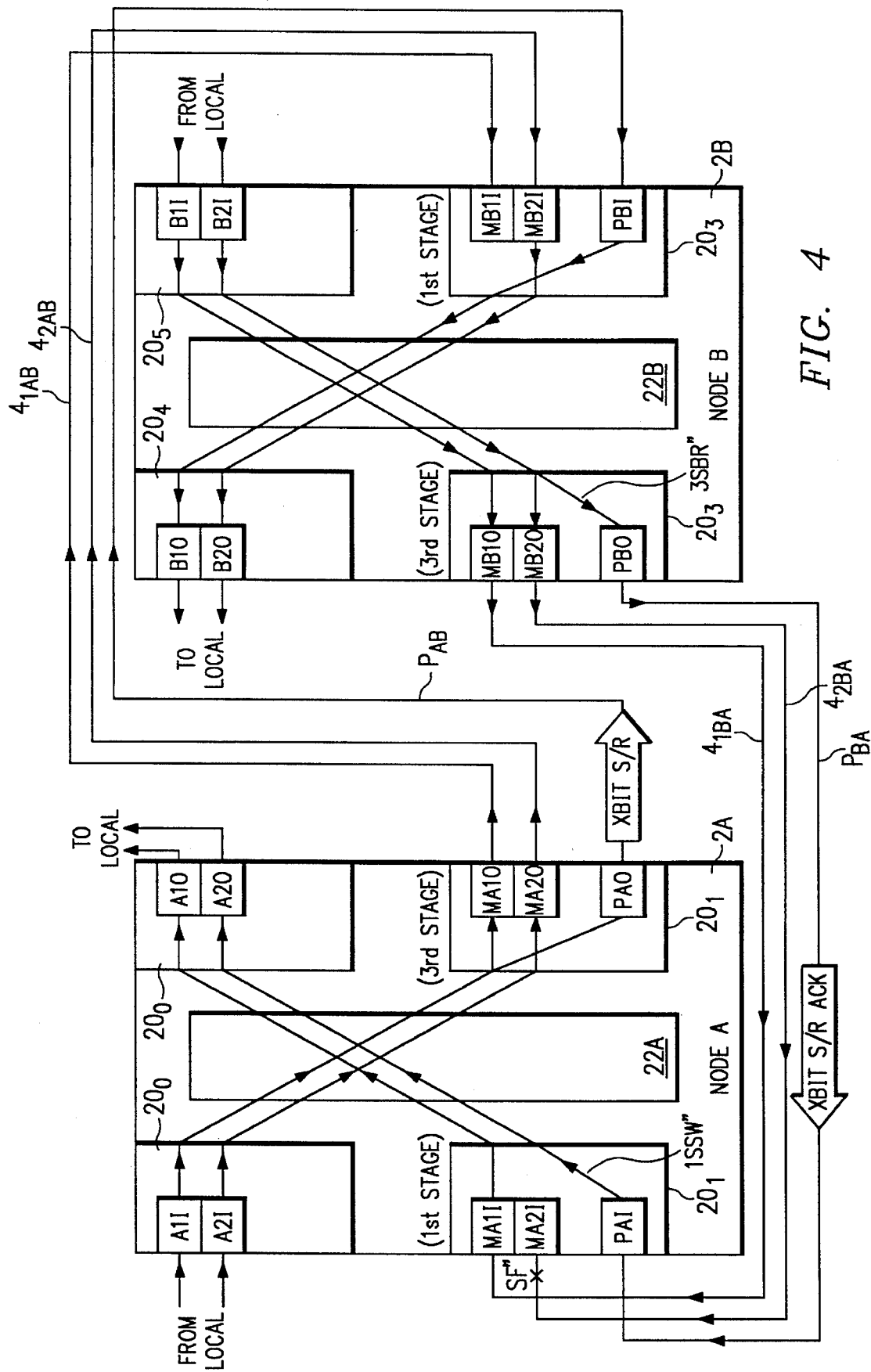
FIG. 4 is a matrix diagram of a digital cross-connect, illustrating the operation of the preferred embodiment of the invention in performing a facility protection switch to a second signal failure.

Referring back to FIG. 5b in combination with FIG. 4, in the event that IPU $16_0$ detects that another member of the protected group is receiving a signal failure (SF" at member input port MA2I of FIG. 4), decision 73 will pass control to process 76 to effect a new bridge/switch without waiting for the timeout period to elapse.

Process 76 is then performed to drop the first stage switch from protection input port PAI back to member input port MA1I. This is followed by process 78 (shown in FIG. 5c), by which node A sends a bridge set/remove request to node B by way of the X-bit channel from protection output port PAO, indicating the identity of the member (MA2I) for which the new bridge is to be made.

The set/remove request is detected by node B at decision 61 in similar manner as a bridge drop request, responsive to which node B drops the third stage bridge in process 62. As the request is a set/remove, decision 63 enables process 65 to be performed by node B in which the requested new third stage bridge (3SBR" of FIG. 4) is made in process 65, and a "good" signal is indicated by protection output port PBO via the X-bit channel to protection input port PAI of node A. Upon detection of the "good" signal at protection input node PAI (decision 77), node A makes the first stage switch (1SSW" of FIG. 4) to connect protection input port PAI to the route previously followed by the failed facility at member input port MA2I. The result of this process is illustrated in FIG. 4.

Upon making of the new bridge and switch, node A will begin the time-out period (decision 57) and will also determine if it should make a new third-stage bridge (decision 51 et seq.), as in the prior case. Node B will revert to the X-bit scan process (process 60) on its respond side, also similarly as in the case of the original signal failure. As in the prior case, if the new failure is a full duplex failure, node B will request a new bridge and node A will respond, in similar manner as for the case described immediately hereinabove, so that full duplex facility protection is effected for a signal failure during the wait-to-restore time.

The present invention thus provides cost effective facility protection capability, where one protection path can protect multiple member paths assigned to the same first/third stage, or input/output "bay" (i.e., circuitry served by a single IPU). As a result of the control of the group facility protection in a distributed manner, facility switching may be effected in an extremely rapid manner, for example on the order of 100 msec or less from a signal failure. In addition, use of the C-bit and X-bit channels in the DS-3 data frame allow for the necessary bidirectional communication to effect the group facility protection within the available DS-3 bandwidth. As a result, high grade of service may be provided by the present invention at a much lower cost relative to conventional 1:1 protection schemes.

While the invention has been described herein relative to its preferred embodiment, it is of course contemplated that modifications of, and alternatives to, this embodiment, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

I claim:

1. A method of providing facility protection by way of a protection path assigned to a plurality of bidirectional member paths between first and second nodes in a telecommunication system, said first and second nodes having a plurality of member ports for communicating a plurality of facilities along said member paths, and having protection ports for communicating a protection facility along said protection path, comprising the steps of:

detecting an error condition in the facility received at a first member input port of said first node from a first member output port of said second node;

responsive to said detecting step, transmitting a bridge request from said protection port of said first node to said second node;

responsive to said transmitting step, bridging the facility from said first member output port of said second node to a protection output port of said second node coupled to said protection path; and after said bridging step, switching said first node to receive the facility from a protection input port of said first node coupled to said protection path.

2. The method of claim 1, wherein said member paths are of the DS-3 type;

and wherein said transmitting step comprises:

transmitting a bridge request signal by way of the C-bit channel.

3. The method of claim 1, further comprising:

after said bridging step, monitoring the facility at the protection input port of said first node to determine if the facility received thereat is valid;

wherein said switching step is performed responsive to said monitoring step.

4. The method of claim 1, wherein the facility transmitted by a first member output port of said first node to a first member input port of said second node corresponds to a signal received at a head port of said first node;

and further comprising:

after said switching step, monitoring said head port to determine if the signal received thereat is valid; and responsive to said monitoring step indicating that the signal received at said head port is valid, bridging the facility from said first member output port of said first node to a protection output port of said first node coupled to said protection path.

5. The method of claim 1, further comprising:

after said switching step, monitoring the facility received at said first member input port of said first node to determine if it has been valid over a selected time period; and responsive to said monitored facility having been valid over the selected time period, reswitching said first node to receive the facility from said first member input port.

6. The method of claim 5, further comprising:

during said step of monitoring the facility received at said first member input port of said first node to determine if it has been valid over a selected time period, detecting an error condition at a second member input port of said first node;

responsive to detecting the error condition at the second member input port, reswitching said first node to receive the facility from said first member input port and transmitting a remove/set bridge signal to said second node;

responsive to said step of transmitting a remove/set bridge signal, bridging the facility from said second member output port of said second node to the protection output port of said second node; and after said step of bridging the facility from said second member output port, switching said first node to receive the facility from the protection input port of said first node.

7. The method of claim 1, wherein said error condition is selected from the group consisting of loss-of-signal, loss-of-frame and alarm indication signals.

8. The method of claim 7, wherein said error condition further comprises excessive error rate conditions.

9. A cross-connect system having group facility protection, comprising:

a plurality of member input ports and member output ports arranged in pairs, so that each member input port and a corresponding member output port are bidirectionally coupled to a path;

a protection input port and a protection output port, coupled to a protection path and assigned to said plurality of member input ports and member output ports;

a central processing unit, coupled to a bus;

a cross-connect matrix, coupled to said bus;

an interface processing unit coupled to said bus, to said member input and output ports, and to said protection input port and protection output port, said interface processing unit for providing the steps of:

monitoring said member input ports to detect an error condition;

requesting a bridge from said network responsive to a detected error condition at a first one of said member input ports; and switching to connect said protection input port to said first member input port to receive the facility thereat, after said requesting step.

10. The system of claim 9, wherein said cross-connect matrix is of the Clos matrix type, having first, center and third stages;

wherein said interface processing unit comprises:

a plurality of interface processors; and a plurality of first/third stage circuits, each coupled to an associated one of said plurality of interface processors;

and wherein said plurality of member input ports and member output ports, and the protection input port and protection output port assigned thereto, are all associated with the same first/third stage circuit.

11. The system of claim 10, wherein said interface processing unit requests a bridge by transmitting a bridge request signal from said protection output port.

12. The system of claim 11, wherein the plurality of member input ports and member output ports, and the protection input port and protection output port, are all of the DS-3 type;

and wherein said bridge request signal is communicated by way of the C-bit channel.

13. A telecommunications system, comprising:

a first cross-connect, comprising:

a plurality of member input ports and member output ports arranged in pairs, each member input port corresponding to a member output port;

a protection input port and a protection output port, both assigned to said plurality of member input ports and member output ports; and an interface processing unit coupled to said member input and output ports, and to said protection input port and protection output port, said interface processing unit for:

monitoring said member input ports to detect an error condition;

issuing a bridge request signal from said protection output port responsive to a detected error condition at a first one of said member input ports; and switching to connect said protection input port to said first member input port to receive the facility thereat, after said issuing step; and a plurality of paths, comprising a plurality of member communications paths coupled to said plurality of member input ports and member output ports of said first cross-connect, and a protection communication path coupled to said protection input port and said protection output port of said first cross-connect;

a second cross-connect, comprising:

a plurality of member input ports and member output ports arranged in pairs, so that each member input port and a corresponding member output port are bidirectionally coupled to a corresponding member output port and member input port, respectively, of said first cross-connect, via a corresponding one of said plurality of member communications paths;

a protection input port and a protection output port, both assigned to said plurality of member input ports and member output ports, and coupled to said protection output port and said protection input port, respectively, of said first cross-connect, via said protection path;

an interface processing unit coupled to said member input and output ports, and to said protection input port and protection output port, said interface processing unit for:

responsive to said bridge request signal, bridging the facility from the first member output port of said second cross-connect to the protection output port of said second cross-connect.

* * * * *

UNITED STATES PATENT AND TRADEMARK OFFICE
CERTIFICATE OF CORRECTION

PATENT NO. : 5,479,608
DATED : December 26, 1995
INVENTOR(S) : C. Douglas Richardson It is certified that error appears in the above-indentified patent and that said Letters Patent is hereby corrected as shown below:

Col. 7, ln. 44, delete "MAiI", insert --MA1I--.

Signed and Sealed this

Twenty-third Day of April, 1996

BRUCE LEHMAN

Attest:

Attesting Officer

Commissioner of Patents and Trademarks